(12) United States Patent
Iliev

(10) Patent No.: US 10,048,046 B1
(45) Date of Patent: *Aug. 14, 2018

(54) SHOOTING RANGE BOOTH ASSEMBLY

(71) Applicant: ShotStop Ballistics LLC, Stow, OH (US)

(72) Inventor: Vall Iliev, Stow, OH (US)

(73) Assignee: Shot Stop Ballistics, Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,196

(22) Filed: Oct. 26, 2016

Related U.S. Application Data

(63) Continuation-in-part of application No. 14/701,326, filed on Apr. 30, 2015, now Pat. No. 9,944,041.

(51) Int. Cl.
*B23K 37/00* (2006.01)
*F41J 11/00* (2009.01)

(52) U.S. Cl.
CPC ..................................... *F41J 11/00* (2013.01)

(58) Field of Classification Search
CPC ........................................................ F41J 11/00
USPC .......................................................... 428/105
See application file for complete search history.

(56) References Cited

U.S. PATENT DOCUMENTS

| | | | |
|---|---|---|---|
| 4,403,012 A | 9/1983 | Harpell et al. | |
| 4,457,985 A | 7/1984 | Harpell et al. | |
| 4,566,237 A | 1/1986 | Turner | |
| 4,613,535 A | 9/1986 | Harpell et al. | |
| 4,623,574 A | 11/1986 | Harpell et al. | |
| 4,650,710 A | 3/1987 | Harpell et al. | |
| 4,737,402 A | 4/1988 | Harpell et al. | |
| 4,748,064 A | 5/1988 | Harpell et al. | |
| 5,257,583 A | 11/1993 | Koenig | |
| 5,552,208 A | 9/1996 | Lin et al. | |
| 5,587,230 A | 12/1996 | Lin et al. | |
| 5,683,781 A | 11/1997 | Komarek et al. | |
| 5,907,930 A | 6/1999 | Ricco, Sr. | |
| 6,007,469 A | 12/1999 | Jaegers et al. | |
| 6,642,159 B1 | 11/2003 | Bhatnagar et al. | |
| 6,841,492 B2 | 1/2005 | Bhatnagar et al. | |
| 6,846,758 B2 | 1/2005 | Bhatnagar et al. | |
| 7,415,806 B2 | 8/2008 | Davidson | |
| 7,661,228 B1 | 2/2010 | Nolte et al. | |
| 7,762,175 B1 | 7/2010 | Bhatnagar et al. | |
| 7,784,232 B2 | 8/2010 | Nygren et al. | |
| 7,921,758 B2 | 4/2011 | Eden et al. | |
| 7,964,267 B1 * | 6/2011 | Lyons ..................... | B29C 33/68 139/383 R |

(Continued)

FOREIGN PATENT DOCUMENTS

WO    WO2015138025 A1    9/2015

*Primary Examiner* — Brent T O'Hern
(74) *Attorney, Agent, or Firm* — John D Gugliotta

(57) ABSTRACT

A shooting range booth is provided having a pair of upwardly extending spaced apart multi-ply walls and a frame element for attaching to and supporting the walls in upright positions. Each walls has a frame connecting inner panels and having outer ballistic resistant plates. The ballistic resistant plates are formed of interlineated layers of modified polyethylene materials and layers of carbon nanotubes between adjacent modified polyethylene material layers. The instant abstract is neither intended to define the invention disclosed in this specification nor intended to limit the scope of the invention in any way.

10 Claims, 1 Drawing Sheet

(56) References Cited

U.S. PATENT DOCUMENTS

| | | |
|---|---|---|
| 8,544,240 B2 | 10/2013 | Hughes, Jr. |
| 9,115,960 B2 | 8/2015 | Kim |
| 2003/0159400 A1 | 8/2003 | Forrester |
| 2005/0086905 A1 | 4/2005 | Ralph et al. |
| 2006/0248827 A1 | 11/2006 | Meeker |
| 2007/0224401 A1 | 9/2007 | Telander |

\* cited by examiner

SHOOTING RANGE BOOTH ASSEMBLY

RELATED APPLICATIONS

The present invention is a Continuation in Part application of U.S. Ser. No. 14/701,326, filed on Apr. 30, 2015 and which was a continuation in part of U.S. Ser. No. 13/219,920, filed on Aug. 29, 2011 and now U.S. Pat. No. 9,180,623, both of which are incorporated by reference as if fully rewritten herein.

BACKGROUND OF THE INVENTION

1. Field of the Invention

This invention relates to an improved composite ballistic material having a very low cost-strength ration that may be formed into panels having superior ballistic resistant properties and, more particularly, to an improved shooting range protective booth assembly, and components and configurations thereof utilizing the same.

2. Description of the Related Art

Ballistic resistant articles containing high [tensile] strength fibers that have excellent properties against projectiles are well known. Such materials provide a lighter option to conventional metal armor or plating. High strength fibers conventionally used include polyolefin fibers, such as extended chain polyethylene fibers; and aramid fibers, such as para- and meta-aramid fibers. For many applications, the fibers may be used in a woven or knitted fabric. For other applications, the fibers may be encapsulated or embedded in a matrix material to form non-woven, rigid or flexible fabrics.

Various ballistic resistant constructions are known that are useful for the formation of hard or soft armor articles such as helmets, structural panels and ballistic resistant vests. For example, U.S. Pat. No. 4,403,012, U.S. Pat. No. 4,457,985, U.S. Pat. No. 4,613,535, U.S. Pat. No. 4,623,574, U.S. Pat. No. 4,650,710, U.S. Pat. No. 4,737,402, U.S. Pat. No. 4,748,064, U.S. Pat. No. 5,552,208, U.S. Pat. No. 5,587,230, U.S. Pat. No. 6,642,159, U.S. Pat. No. 6,841,492, U.S. Pat. No. 6,846,758, and U.S. Pat. No. 7,762,175, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

Other examples, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. Further, U.S. Pat. Nos. 5,552,208 and 5,587,230 disclose an article and method for making an article comprising at least one network of high strength fibers and a matrix composition that includes a vinyl ester and diallyl phthalate. And, U.S. Pat. No. 6,642,159 discloses an impact resistant rigid composite having a plurality of fibrous layers which comprise a network of filaments disposed in a highly rigid matrix, with elastomeric layers there between. The composite is bonded to a hard plate to increase protection against armor piercing projectiles.

Existing shooting ranges are generally permanent facilities constructed on site. These ranges can be either outdoor or indoor shooting ranges. For outdoor shooting ranges permanent shooting stations, target areas, bullet stops, etc. are constructed on a large plot of land. Although outdoor shooting ranges are designed with safety are a primary consideration, there is, however, the possibility of injury to participants and onlookers within a large surface danger zone. For instance, participants, onlookers, and those unauthorized persons walking in the danger zone can be injured from accidental misfires which may not be directed toward the targets.

For indoor shooting ranges the architect or designer does not have an element of space to utilize for added safety. As a consequence, for indoor ranges the use of a lot of steel armor plating is used for protection of the shooters. With such designs, the increase in noise, added cost, difficulty of installation and lack of aesthetic can all become problems.

Consequently, a need has been felt for providing improved shooting range protective booth assemblies, and components and configurations thereof, designed around the ballistic materials of the Related Applications.

SUMMARY OF THE INVENTION

It is therefore an object of the present invention to provide a composite ballistic shielding material with a very low cost-weight ratio, and a very low cost-strength ratio.

It is a feature of the present invention to provide a modularly manufactured panels having superior ballistic resistant properties that may be configured into protection booths for shooting ranges.

In a preferred aspect of the present invention, an otherwise amorphous plastic such as high density polyethylene ("HDPE") having an unaligned, non-crystalline molecular structure is modified such as to result in a planar sheet material having a targeted molecular alignment. By mechanically modifying the HDPE, the alignment of the fibers creates an anisotropic material that can be further utilized as molecularly oriented thin planar sheets to replace or supplement the use of fibers in the manufacture of ballistic shielding as described in the Related Art, above.

The use of molecularly oriented planar sheets of material can provide improved shooting range components for protective booth assemblies and configurations.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. DETAILED DESCRIPTION OF THE FIGURES

Figure 3:
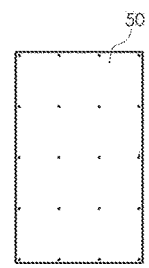
FIG. 3 is a front elevational view of a ballistic resistant panel element 50 for use within the preferred embodiment of the present invention.
Figure 2:
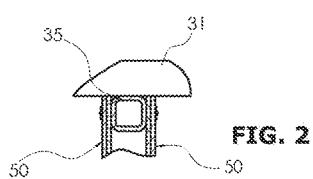
FIG. 2 is a cross sectional detail taken along cut line II-II of FIG. 1.
Figure 1:
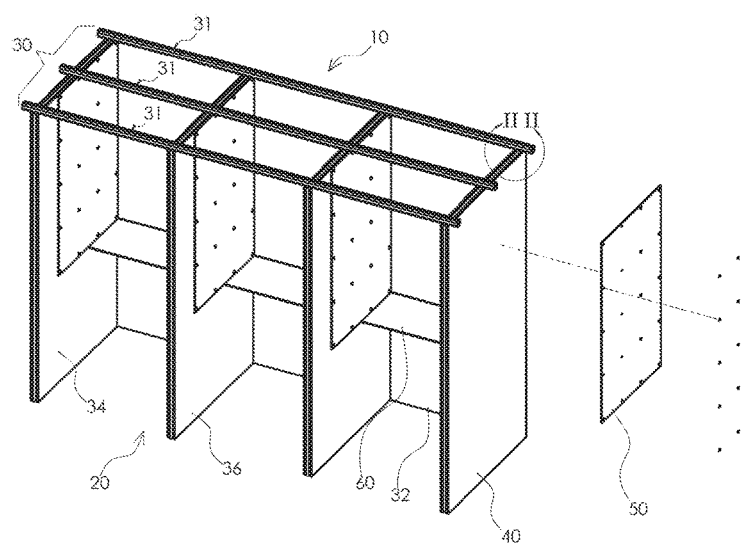
FIG. 1 is a perspective view of a shooting booth module according to the preferred embodiment of the present invention.

Referring now to FIG. 1-3, a shooting booth configuration, generally noted as 10, is shown incorporating the improvement, features and advantages of the present invention. The booth 10 may be of a modular design accommodating one or a plurality of individual shooting lanes 20. The booth 10 includes a frame assembly 30 erected for support for and attachment by other various components of each shooting lane 20, including a front shield assembly 32, a left booth wall 34, and a right booth wall 36, each forming a further shield assembly as will be described in greater detail below.

In greater detail, it is anticipated that the left booth wall 34 and the right booth wall 36 may be of a common construction and components. According to an aspect of the present invention the components of either booth wall 34/36 may be reconfigured to form the opposite assembly. Each booth wall 34/36 further comprises a structurally independent shooting wall 40. While any individual size and shape may be adapted as a mere design choice within the overall equivalent of the present invention, each shooting wall 40 may be a generally rectangular, planar panel greater than 36 inches in width and having a overall height of sufficient dimension to provide containment and cover for a user positives within a shooting station. According to another aspects of the present invention, the panels 40 may extend the height of the room in which it is assembled. According to yet another aspect of the present invention, the panels 40 are greater than 7 feet in overall height and may be configures as part of a freestanding assembly within a shooting range space, either indoor or outdoor.

As shown best in conjunction with FIG. 3, each booth wall 34/36 comprises a panel 40 and a ballistic resistant plating 50. Each plating element 50 is intended to be pre-configured for standardization of assembly and of a material described in the Related Applications. By way of example, and not meant as a limitation, each plating element 50 may be formed of a textured planar material or flat planar material formed of strand or ribbon oriented strips of polyethylene as shown, taught and described in the Related Art, and especially as shown in U.S. Pat. No. 9,180,623, incorporated by reference as if rewritten herein in its entirety. As shown generally in the related art, the use of PE or HDPE in the production of composite materials capable of being used to create anti-ballistic devices is taught through the use of blending with carbon nanotube or other additives, orienting the materials into aligned strips to create oriented plies of materials, and then layering numerous plies at an bias to one another while building a desired thickness of material. Such processing transforms relatively inexpensive, common plastic materials into composite panels that both have anti-ballistic properties, as well as can be further formed into three dimensional shaped products in custom shapes.

As shown best in conjunction with FIG. 2, the construction of the frame assembly 30 and its connection to each shield assembly 34/36 is shown in greater detail. The frame assembly 30 may include any number of support stringers 31. The shooting booth wall 34/36 includes a structural support element 35 within that may be affixed to each support stringer 31 with fasteners (not shown). Further, the support element 35 may further affix inside wall elements 42 and outside wall element 44 that each, in turn, support a ballistic resistant plating panel 50.

Finally, as should be understood in conjunction with the present and related prior teachings, the configuration of a final product designs may be formed in a modular manner so as to be expanded to include any number of individual shooting modules 20 desired. The full assembly may therefor be fabricated on-site in a convenient manner. Aside from providing shielding at the sides and front to protect against ricochet projectiles, an additional shelf element 60 may be further provided within each module 20. Given the lightweight materials and convenient configuration, the various components may be further provided with interior design or aesthetic elements that are not otherwise available within shooting range protection systems.

2. OPERATION OF THE PREFERRED EMBODIMENT

In operation, the planar sheets of molecularly oriented plastic (such as HDPE) may be used for the further manufacture of a anti-ballistic shielding panels 50 for use in protective booth walls 34/36 or front protection panels 32. Utilizing the laminated composite material of the present invention, superior ballistic resistant properties are achieve. The resulting composite ballistic material have a very low cost-weight ratio. Further, the resulting composite ballistic material has a very low cost-strength ratio. Further still, the resulting ballistic material is manufactured without using fiber as the reinforcement. Further still, a modular shooting panel booth design using such ballistic materials may be designed to incorporate elements of interior design that may then provide an ability to enhancing the interior space of a shooting range to achieve a healthier and more aesthetically pleasing environment for the end user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A shooting range booth assembly comprising;
   at least a pair of upwardly extending spaced apart multi-ply walls;
   a frame element comprising at least one support stringer for attaching to and supporting said walls in upright positions;
   each of said walls having a frame and inner panels connected to said frame, and having outer ballistic resistant plates affixed to an outer surface of said inner panels;
   said outer ballistic resistant plates further comprising:
     interlineated layers of modified polyethylene materials; and
       layers of carbon nanotubes between adjacent modified polyethylene material layers;
     wherein each said interlineated layer of modified polyethylene material is formed having a molecularly oriented layer of material.

2. The shooting range booth assembly of claim 1, wherein each said interlineated layer of modified polyethylene material further comprises:
    a plurality of film strips oriented side by side and affixed with a thermosetting adhesive, wherein each said plurality of film strips are less than approximately 0.010 in width and oriented to adjacent said interlineated layers at a bias angle and to a pre-determined number of layers having a thermosetting adhesive between said adjacent said interlineated layers to a desired thickness.

3. A shooting range booth assembly as recited in claim 1 and having a transverse flat shelf mounted between each pair of upwardly extending spaced apart multi-ply walls.

4. A shooting range booth assembly as recited in claim 2 and having a transverse flat shelf mounted between each pair of upwardly extending spaced apart multi-ply walls.

5. A shooting range booth assembly as recited in claim 1, wherein said at least a pair of upwardly extending spaced apart multi-ply walls are of common construction such as to be interchangeable.

6. A shooting range booth assembly as recited in claim 2, wherein said at least a pair of upwardly extending spaced apart multi-ply walls are of common construction such as to be interchangeable.

7. A shooting range booth assembly as recited in claim 3, wherein said at least a pair of upwardly extending spaced apart multi-ply walls are of common construction such as to be interchangeable.

8. A shooting range booth assembly as recited in claim 4, wherein said at least a pair of upwardly extending spaced apart multi-ply walls are of common construction such as to be interchangeable.

9. A shooting range booth assembly as recited in claim 1, wherein said at least a pair of upwardly extending spaced apart multi-ply walls further comprise aesthetic interior design elements.

10. A shooting range booth assembly as recited in claim 5, wherein said at least a pair of upwardly extending spaced apart multi-ply walls further comprise aesthetic interior design elements.

\* \* \* \* \*